United States Patent [19]
Tambussi

[11] Patent Number: 5,985,399
[45] Date of Patent: *Nov. 16, 1999

[54] LIGHTWEIGHT CASKET

[75] Inventor: William C. Tambussi, Cherry Hill, N.J.

[73] Assignee: Batesville Casket Company, Inc., Batesville, Ind.

[*] Notice: This patent is subject to a terminal disclaimer.

[21] Appl. No.: 08/897,107

[22] Filed: Jul. 18, 1997

Related U.S. Application Data

[62] Division of application No. 08/495,323, Jun. 27, 1995, Pat. No. 5,685,937, which is a continuation of application No. 08/124,638, Sep. 22, 1993, abandoned.

[51] Int. Cl.$^6$ .................................................. A61G 17/013
[52] U.S. Cl. ........................... 428/55; 428/49; 428/47; 428/54; 428/73; 428/77; 428/116; 428/121; 27/4
[58] Field of Search ................................. 428/55, 45, 47, 428/54, 73, 77, 116, 121; 27/4

[56] References Cited

U.S. PATENT DOCUMENTS

| | | | |
|---|---|---|---|
| 678,348 | 7/1901 | Nichols | 27/3 |
| 768,481 | 8/1904 | Post | 27/2 |
| 1,234,180 | 7/1917 | Kersten | 27/3 |
| 1,507,957 | 9/1924 | Edwards | 27/3 |
| 2,494,473 | 1/1950 | Dowling | 27/3 |
| 3,164,880 | 1/1965 | Hotchkiss | 27/3 |
| 3,220,080 | 11/1965 | Connelly | 27/2 |
| 3,490,114 | 1/1970 | Connelly et al. | 27/2 |
| 3,574,906 | 4/1971 | Rittenhouse | 27/4 |
| 3,729,786 | 5/1973 | Walding | 27/3 |
| 3,753,843 | 8/1973 | Hutchison | 428/116 |
| 3,789,094 | 1/1974 | Hutchison | 428/116 X |

(List continued on next page.)

FOREIGN PATENT DOCUMENTS

| | | |
|---|---|---|
| 3-198852 | 8/1991 | Japan . |
| 3-88517 | 9/1991 | Japan . |
| 4-3729 | 1/1992 | Japan . |
| 4-3730 | 1/1992 | Japan . |
| 1145571 | 3/1969 | United Kingdom . |
| 2 064 485 | 6/1981 | United Kingdom . |
| 2 114 498 | 8/1983 | United Kingdom . |
| 1535188 | 12/1988 | United Kingdom . |

*Primary Examiner*—Timothy Speer
*Attorney, Agent, or Firm*—Barnes & Thornburg

[57] ABSTRACT

A lightweight structurally sound casket formed preferably of a sandwich construction using a core of an open cell or honeycomb patterned material and fluid resistant surface elements. The casket is comprised of a body containment portion and a lid portion, each of which has the sandwich construction as the main structural element. The open cell material is structurally enhanced by being sandwiched between first and second stabilizing surface elements in both the body containment portion and the lid portion. In addition to the stabilizing surface elements, an aesthetically pleasing material is adhered to the outer portions of the body containment section and lid so that the casket has an attractive appearance. The body containment portion is constructed from rectangular pieces of the open cell material and stabilizing surface elements by folding the same into a box-like configuration. The lid portion is formed from placing the open cell material and the stabilizing surface elements into a jig, applying adhesive between the elements and finally, applying pressure thereto for adhering the elements together. As a final touch to the casket, ornamental features such as corner pieces and handles are added to the casket for aesthetic effects. The casket is environmentally safe for cremation and interment ceremonies and is economic and lightweight.

19 Claims, 5 Drawing Sheets

U.S. PATENT DOCUMENTS

| | | | |
|---|---|---|---|
| 3,969,798 | 7/1976 | Sahlin | 27/4 |
| 4,044,435 | 8/1977 | Acton | 27/2 |
| 4,151,630 | 5/1979 | Havey | 27/2 |
| 4,176,431 | 12/1979 | Havey, III | 27/2 |
| 4,261,083 | 4/1981 | Darby et al. | 264/256 X |
| 4,730,370 | 3/1988 | Elder | 27/4 |
| 4,773,134 | 9/1988 | Kay | 27/2 X |
| 4,891,869 | 1/1990 | Nutting | 27/4 |
| 4,902,365 | 2/1990 | Westlake, Sr. | 428/116 X |
| 4,944,076 | 7/1990 | Kay et al. | 27/14 |
| 4,967,455 | 11/1990 | Elder | 27/4 |
| 4,990,391 | 2/1991 | Veta et al. | 428/116 |
| 5,035,032 | 7/1991 | Nutting | 27/4 |
| 5,041,323 | 8/1991 | Rose et al. | 428/116 |
| 5,106,668 | 4/1992 | Turner et al. | 428/116 |
| 5,111,559 | 5/1992 | Mohr et al. | 27/4 |
| 5,245,733 | 9/1993 | Goria | 428/116 X |
| 5,307,545 | 5/1994 | Stoltz | 27/4 |
| 5,353,484 | 10/1994 | Woedl et al. | 27/4 |
| 5,454,141 | 10/1995 | Ozbun et al. | 27/4 |
| 5,685,937 | 11/1997 | Tambussi | 156/196 |
| 5,770,291 | 6/1998 | Tambussi | 428/116 X |

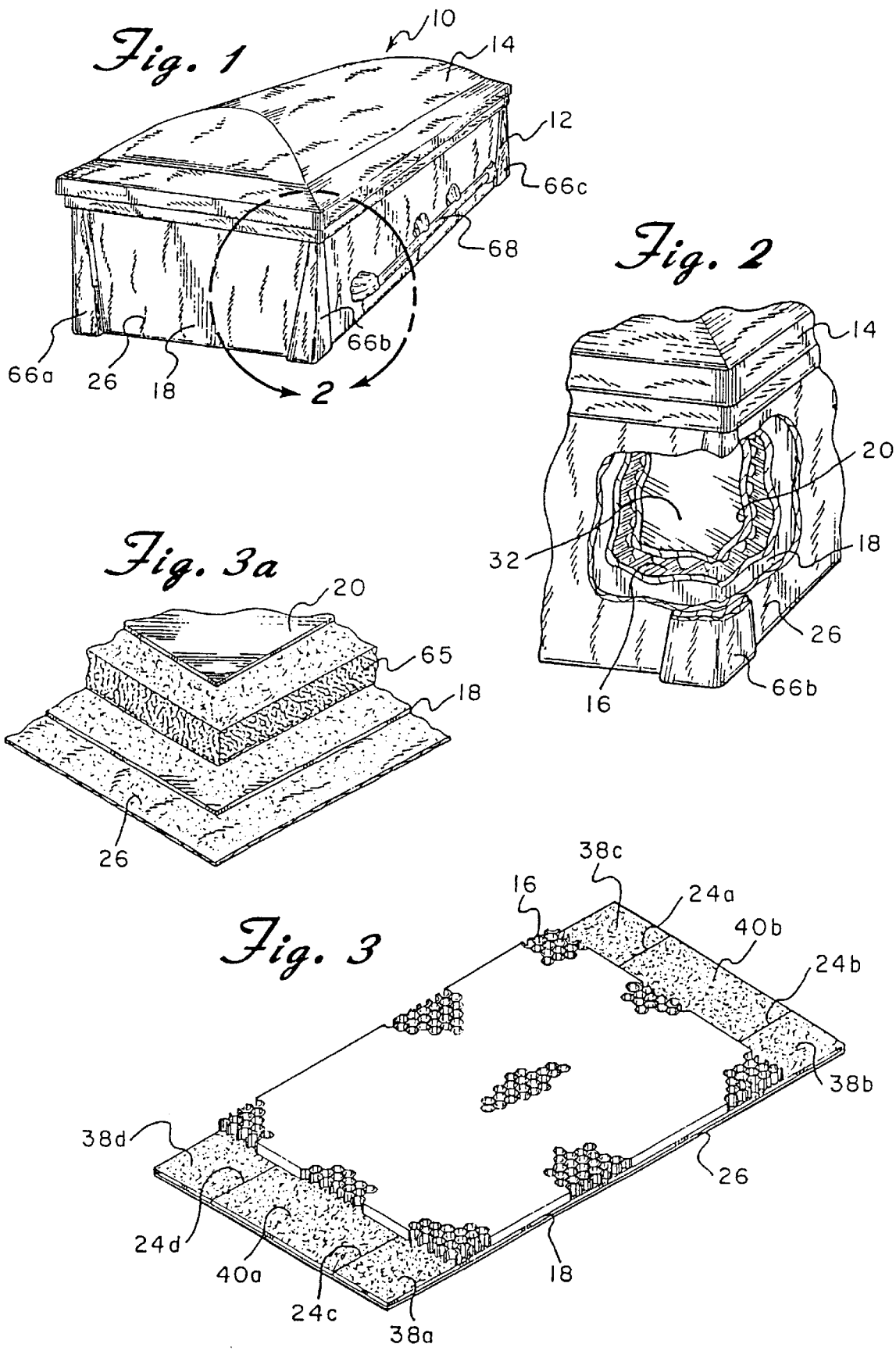

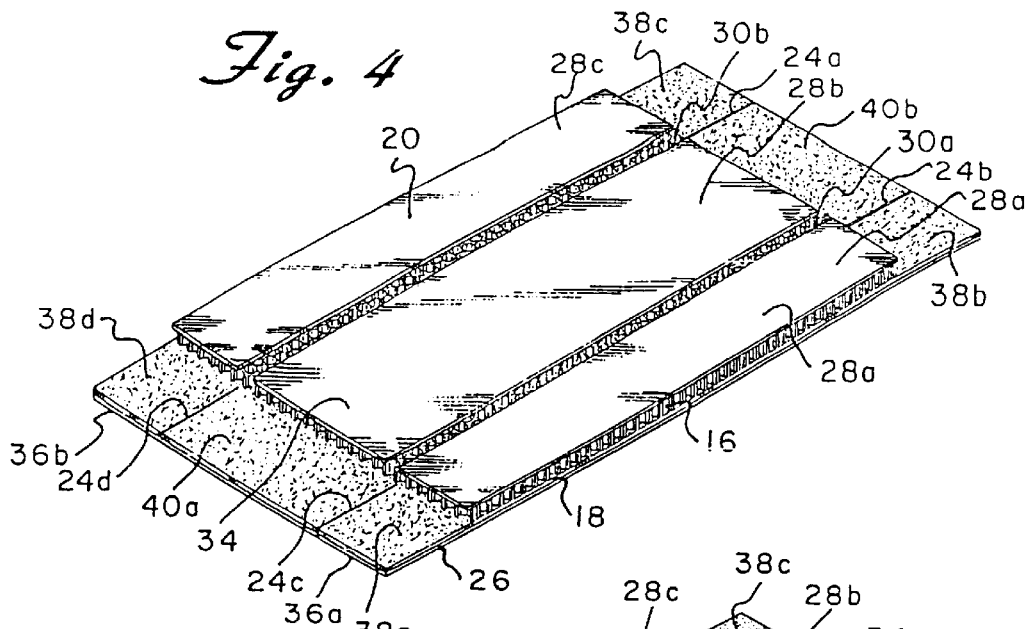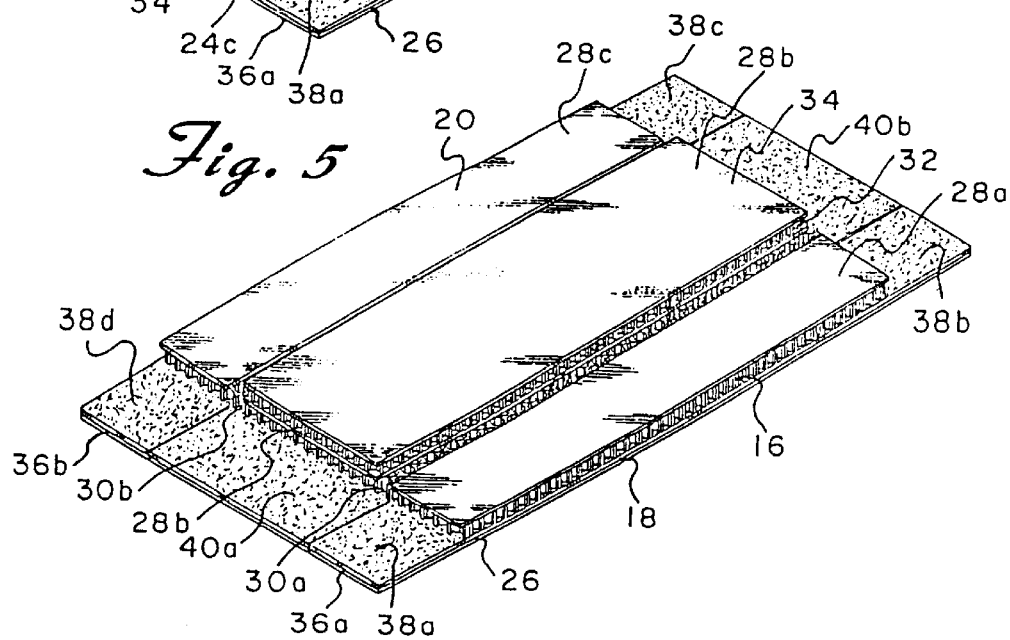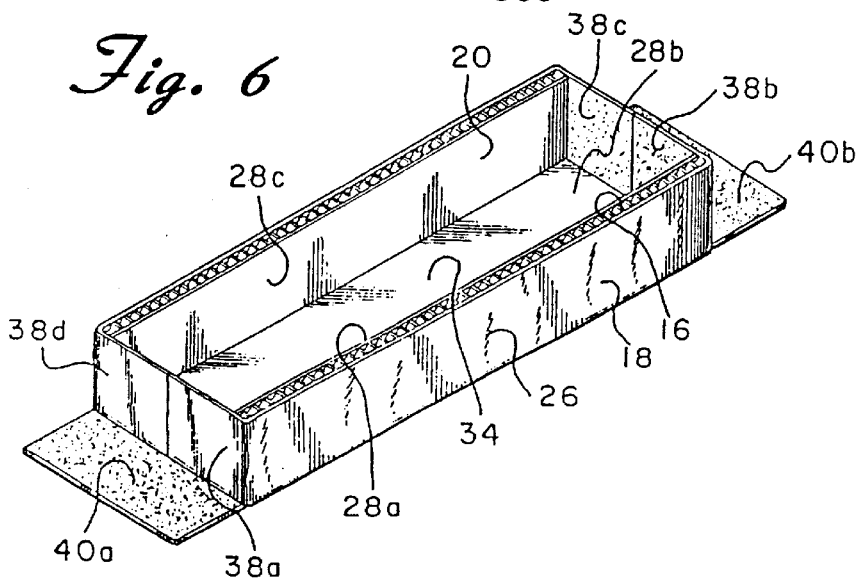

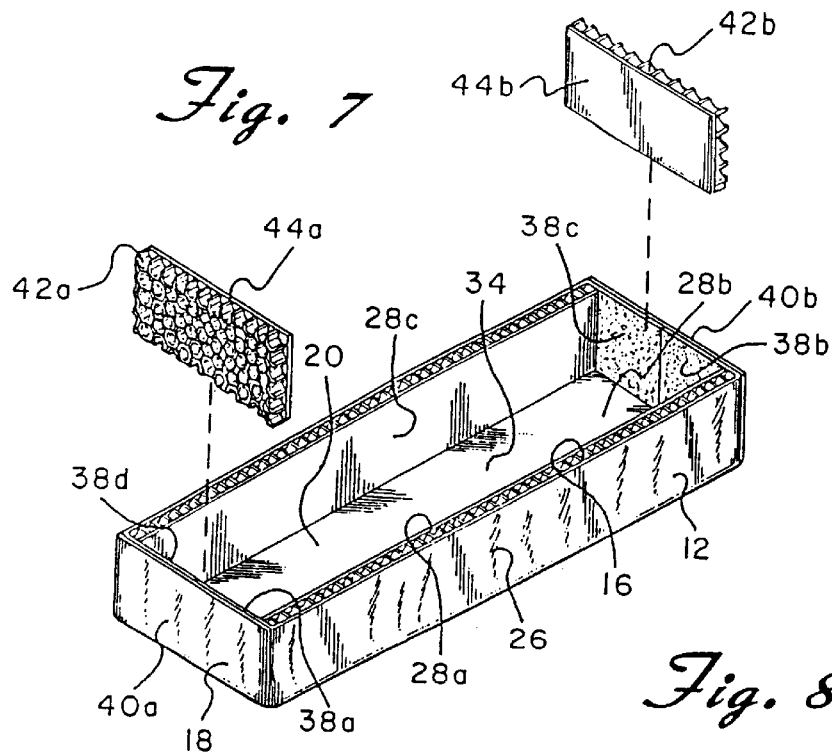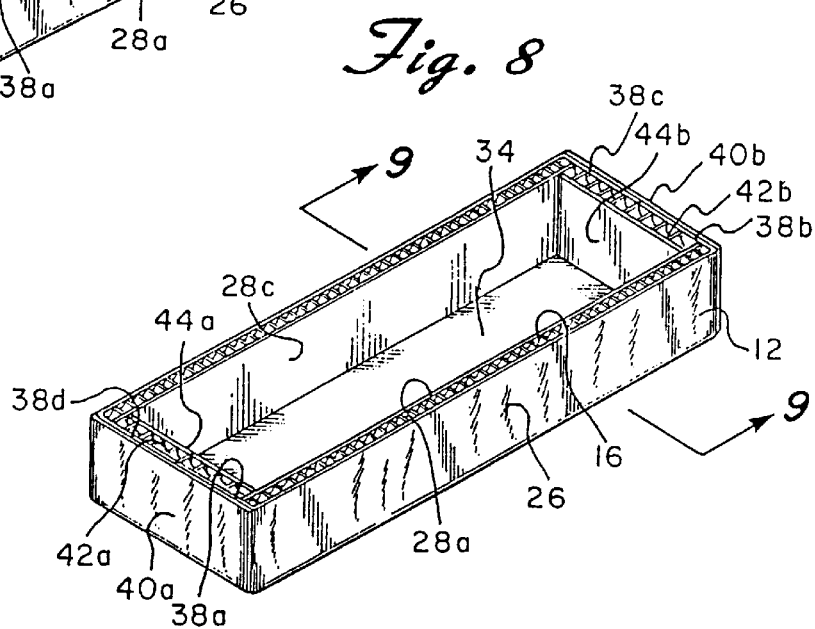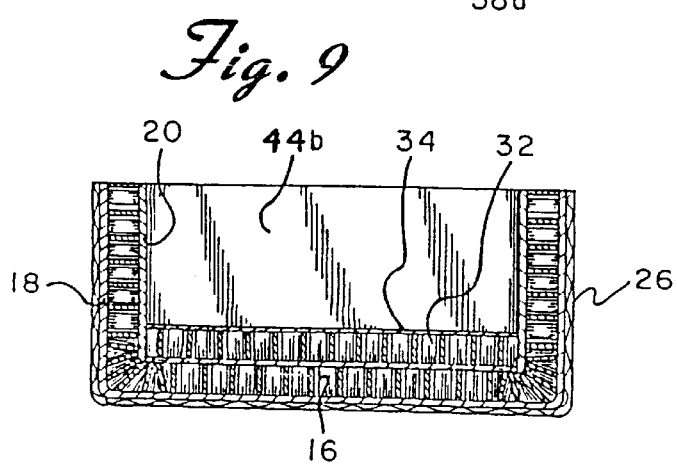

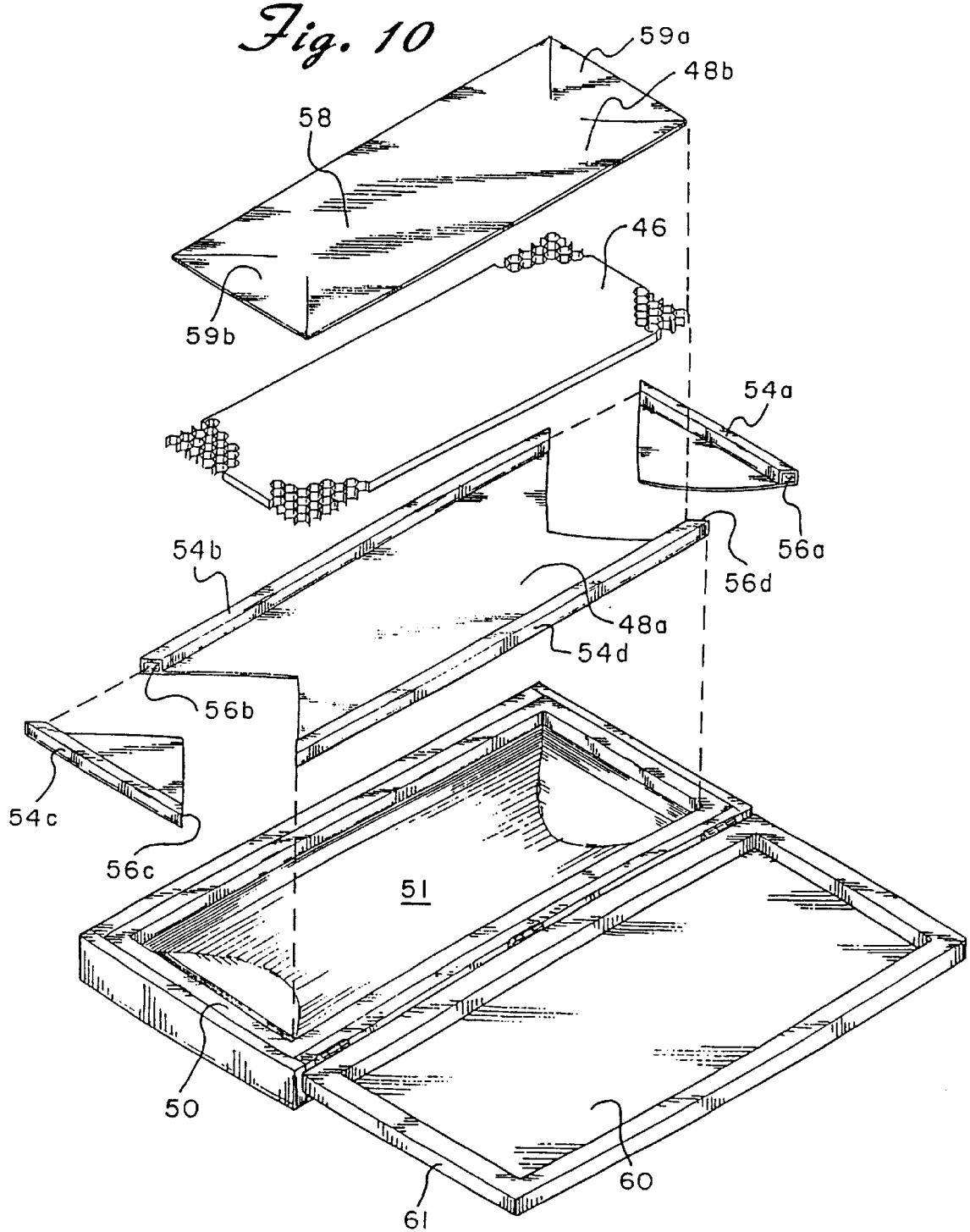

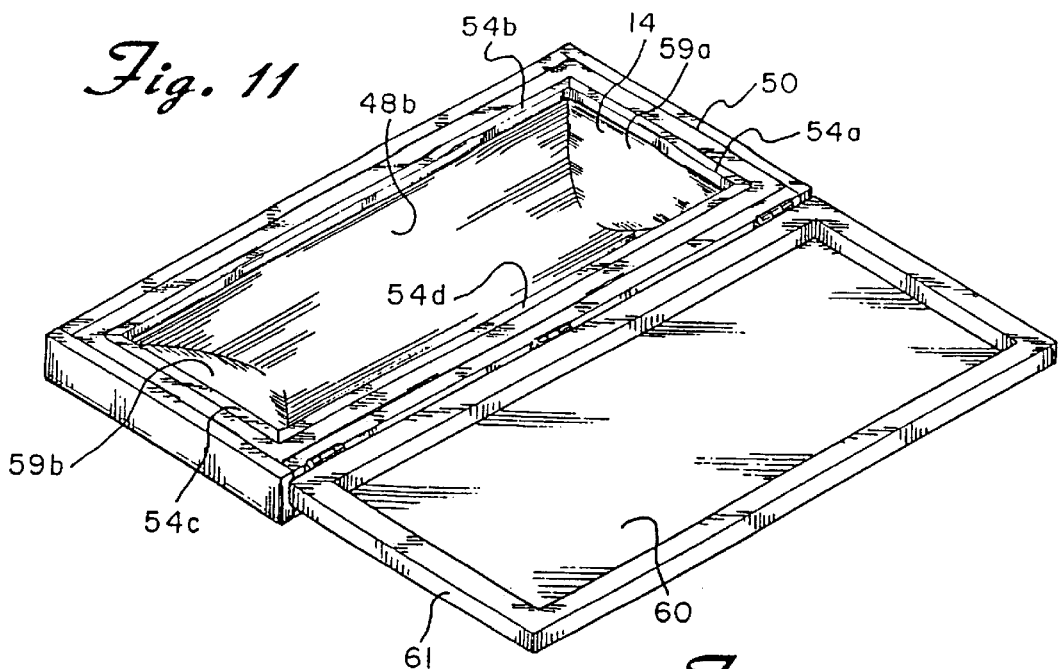
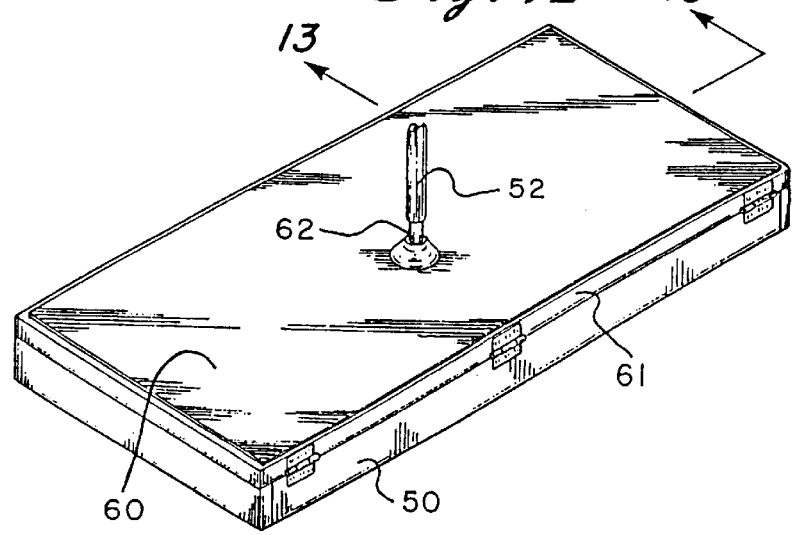
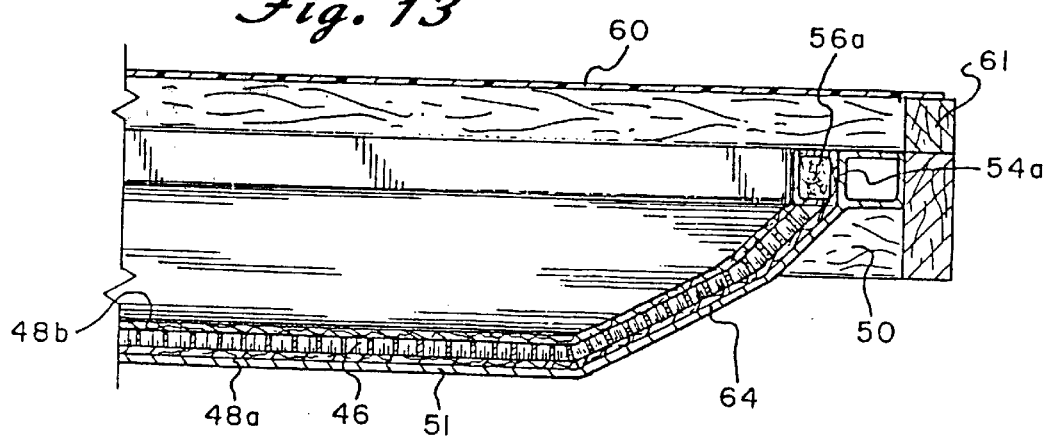

LIGHTWEIGHT CASKET

This is a divisional of application Ser. No. 08/495,323 filed Jun. 27, 1995, now U.S. Pat. No. 5,685,937, which is a continuation of application Ser. No. 08/124,638 filed Sep. 22, 1993, now abandoned.

BACKGROUND OF THE INVENTION

This invention relates to caskets or coffins used to house the remains of once living organisms. More particularly, this invention is directed toward a lightweight yet structurally strong casket highly suitable for cremation-type and interment ceremonies. The casket exhibits excellent structural integrity while being highly flammable and minimally harmful to the environment.

The riddance of the bodies of the deceased can be accomplished in several ways, including burial and cremation. Because of the growing concern for the world's environment, both of these methods have been highly scrutinized. Environmental problems include the overpopulation of cemeteries and the effects of placing a corpse into the ground. In addition, environmental concerns arise from cremation, which is done in part to alleviate the concerns regarding burial, wherein harmful volatile organic compounds (VOC's) are released to the atmosphere via the burning of environmentally unsafe materials which are often used to manufacture caskets or coffins.

In response to the environmental concerns surrounding cremation and in response also to the ever-rising costs of coffins and/or caskets for burial, inexpensive, lightweight and environmentally safe caskets have been developed. Most of these caskets are constructed from corrugated cardboard or the like. Corrugated cardboard tends to absorb moisture and degrades structurally when it is exposed thereto. However, because of the inadequate structural integrity of corrugated cardboard caskets, such caskets tend to twist and bend thereby threatening the security of the corpse therein and risking the stability of the miental health of friends and relatives who may unwantinigly witness an unscheduled viewing of the deceased should the casket fail.

In the prior art, for example, the patent to Elder, U.S. Pat. No. 4,967,455 discloses a cardboard casket and a method of manufacturing the same. The patent discloses a corrugated cardboard casket constructed from multiple blanks of cardboard which are attached and folded to create the enclosure which forms the casket. However, as can be seen from the drawing and the text, only the use of corrugated cardboard is disclosed. Corrugated cardboard, which is currently and predominantly used in making lightweight caskets, inherently lacks structural integrity and, therefore, causes things made from it to also lack structural integrity. Therefore, the casket in Elder poses the risk of structural failure.

For the morbid partygoer, U.S. Pat. No. 4,891,869 to Nutting, discloses a cardboard coffin for use at parties or similar occasions which is formed from a plurality of corrugated cardboard blanks. Again, the coffin is constructed by folding the corrugated cardboard into the shape of the casket or coffin. As with Elder, the use of the corrugated cardboard fails to provide the coffin with the necessary strength and structural rigidity of a more expensive coffin constructed from stronger materials.

While the foregoing patents disclose the use of cardboard for constructing a more economical and environmentally safe casket, none of the prior patents discloses the use of polymer coated cellulose fiber (PCCF) or other material arranged in an open cell pattern or other patterns exhibiting similar high strength when constructed in accordance with this invention.

SUMMARY OF THE INVENTION

The invention disclosed herein is directed toward an economical and environmentally safe casket having excellent structural integrity for maintaining the shape of the casket and for exhibiting low torsional displacement during the carrying of the deceased. These properties are exhibited even when the casket is exposed to a high moisture environment.

In accordance with the invention, the lightweight casket comprises a body containment compartment and a lid constructed from a core section of polymer coated cellulose fiber (PCCF) arranged in an open cell pattern. The core section for both the lid and for the body containment portion is comprised of a first and a second surface, wherein each surface is attached to a stabilizing surface element thereby causing a sandwich-type effect. Additionally, the core of this sandwich could be made of a solid surface structural material such as polystyrene foam.

The core section may be comprised of a plurality of honeycomb cells wherein each cell is substantially a cylindrically shaped tube. The stabilizing surface elements are surface-treated planar sheets glued or otherwise attached to the open cell patterned core of PCCF. The combination of the open cell pattern core and the sandwiching effect via the stabilizing surface elements, supplies the structural rigidity of the casket. The core material provides the shear force for carrying the sandwich construction while the stabilizing surface elements carry the bending forces of the sandwich. The core material having the open cells perpendicular to the stabilizing surface elements exhibit a much stronger and stiffer structural shear carrying member than a longitudinally aligned corrugated configuration.

This invention also includes the method of constructing the lightweight casket. The open cell patterned core section is first cut into a rectangular pattern suitable in size for folding into the body containment section. A first stabilizing surface element is attached to the underside of the core section, and a second stabilizing surface element comprising a plurality of sections is similarly attached to the upper portion of the core section but arranged in a pattern allowing the folding of the core section into the body containment section. During bonding of the stabilizing surface elements thereto the core acts as a pressure transfer mechanism to assure proper bonding. Upon folding, the walls and bottom of the body containment section are established and are adhered to each other for maintaining the enclosure-type structure. Finally, a lid is formed in a similar manner from a core section and stabilizing surface elements which are caused to form a dome-like shape via use of a jig and the application of air pressure.

The casket disclosed is lightweight yet structurally rigid for supporting and carrying the contents placed therein. By using PCCF in lieu of more expensive materials, economic and environmental concerns are precluded while a very strong lightweight structure is established via the use of the open cell pattern and stabilizing surface elements.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of a lightweight casket constructed in accordance with the principles of the present invention;

FIG. 2 is a partial cross sectional view taken along line 2 of FIG. 1;

FIG. 3a discloses the use of a polystyrene based, solid surface, core in lieu of the honeycomb, open cell structure, core;

FIG. 3 is a perspective view of the honeycomb core and first stabilizing surface element;

FIG. 4 is a perspective view of the honeycomb core attached to the first and second stabilizing surface elements;

FIG. 5 is a view similar to FIG. 4 with the addition of a second layer of core section attached to the inner bottom surface of the casket;

FIG. 6 Is a perspective view of the lightweight casket during the folding stage;

FIG. 7 is a perspective exploded view of the casket showing the insertion of the end inserts;

FIG. 8 is a perspective view of the body containment portion of the casket prior to the addition of aesthetic features;

FIG. 9 is a cross sectional view taken along line 9—9 of FIG. 8;

FIG. 10 is an exploded view of the method of construction of the casket lid using a jig;

FIG. 11 is a perspective view of the casket lid and jig with the jig cover in the open position;

FIG. 12 is a perspective view of the jig cover and air pressure connector, and

FIG. 13 is a cross-sectional view taken along line 13—13 of FIG. 12.

DETAILED DESCRIPTION OF THE PREFERRED EMBODIMENT

Referring now to the drawings in detail wherein like reference numerals have been used throughout the various figures to designate like elements, there is shown in FIG. 1 a perspective view of the lightweight casket constructed in accordance with the principles of the present invention and designated generally as 10. The casket 10 is comprised essentially of the body containment portion 12 and the lid section 14. As shown in FIG. 2 for the body containment portion, it is comprised largely of the open cell core section 16, preferably a honeycomb pattern, being sandwiched between a first stabilizing surface element 18 and a second stabilizing surface element 20, both of which are formed from a fluid resistant material. The lid 14 is constructed in a similarly layered manner.

The formation of the body containment portion 12 is accomplished in part as shown in FIG. 3. The honeycomb core 16 is cut to a substantially rectangular shape and of a size adapted to be folded into the casket. In forming the body containment portion 12, the first stabilizing surface element 18 is placed underneath the honeycomb core 16, while the second stabilizing surface element 20 is placed on top of the honeycomb core 16, as shown in FIG. 4. The first stabilizing surface element 18 is substantially rectangular in shape and scored with fold lines, as shown in FIG. 3, as well as being cut in four places 24a through 24d. The first stabilizing surface element 18, as shown, is larger in length than the core section 16. The fold lines and the cuts 24a through 24d function to facilitate the folding of the honeycomb core with the stabilizing surface elements attached thereto into the enclosure as shown in FIGS. 6, 7 and 8. The fold lines are not shown but are merely continuations of the cuts 24a through 24d as well as being perpendicular to those cuts adjacent the edge of the core section 16.

The honeycomb core 16 is preferably formed from polymer coated cellulose fiber (PCCF) sheets but environmentally safe plastic or the like will also suffice. The core is comprised of a plurality of longitudinally extending cylindrically shaped cells interconnected and forming a honeycomb pattern. Because of their cylindrical shape, the members have strong structural rigidity along their longitudinal axes.

With the first stabilizing surface element 18 being scored and cut for folding, the honeycomb core 16 is adhered to the upper surface thereof utilizing any suitable adhesive. In addition, an aesthetically pleasing material 26 is adhered to the underside of the first stabilizing surface element 18 for incorporating a pleasing texture and appearance to the casket. The second stabilizing surface element 20 is similarly adhered to the honeycomb core. However, the stabilizing surface element 20 is comprised of a plurality of separate sections 28a through 28c. The sections 28a through 28c comprise three rectangularly-shaped planer sheets which are arranged upon the honeycomb core as shown in FIG. 4. As can be seen, the separate sections are of sizes which allow spaces between the sections leaving rectangular portions 30a and 30b of exposed honeycomb.

In a second embodiment, these spaces of core material left between the stabilizing elements may be cut on a forty five degree angle from the stabilizing element edges to the middle of the space. These angled cuts help to facilitate the folding of the core material and stabilizing elements into the body containment section. In a third embodiment, the core material between the stabilizing elements is removed and inserts are placed in the spaces for additional support.

The purpose of the sandwiching effect of the honeycomb core between the two stabilizing sections is to provide the honeycomb core with structural rigidity by maintaining the cells of the core in a substantially perpendicular orientation to applied forces. The core acts as a pressure transfer mechanism and transfers the load to the outer stabilizing surface element 18 when a force is applied thereto. By leaving uncovered the exposed honeycomb core sections 30a and 30b, as provided for by the separate sections, the exposed honeycomb lacks the structural rigidity of the sandwiched honeycomb core. These exposed and, therefore, weaker sections of honeycomb inherently create fold lines on the core surface.

In addition to the core 16, an additional layer 32 of core, as shown in FIG. 5, is glued to the structure over the center portion 28b of the second stabilizing surface element 20. The additional core 32 is of substantially the same size as the center portion 28b and in addition has a third stabilizing surface element 34 glued to the top thereof. The additional honeycomb core and stabilizing surface further strengthens and increases the structural rigidity of the casket bottom and provides extra structural security.

Referring now to FIGS. 5 and 6, the lightweight casket is now ready for formation into the body containment portion 12. To initiate this process, the sides of the casket 36a and 36b are folded upward along the fold lines (not shown), cut lines 24a through 24d and the rectangular and exposed honeycomb sections 30a and 30b. By following this procedure, the formation shown in FIG. 6 is the result. Upon folding the sides 36a and 36b, the corners 38a through 38d must be folded inward towards the center of the body containment portion 12. As shown in FIG. 6, the corners 38a through 38d become part of the ends of the body container portion 12. However, the ends are further completed by folding upward the end extensions 40a and 40b toward the folded corners 38a through 38d. Before folding the extensions 40a and 40b, adhesive is applied on the contact surfaces thereof for adherence to the outside surfaces of the folded corners 38a through 38d. This provides a double shear path and increases the strength of the enclosure.

Referring now to FIG. 7, the body containment portion is ready for insert of the end inserts 42a and 42b. Each end insert is comprised of the rectangular portion of honeycomb material having a stabilizing surface element 44 adhered thereto. The stabilizing surface elements 44a and 44b are adhered to the surface of the end inserts 42a and 42b facing the inner portion of the body containment portion 12 wherein the end extensions 40a and 40b act as the other stabilizers for the inserts 42a and 42b, respectively. Accordingly, the end inserts are inserted adjacent each end of the body containment portion. The side of each end insert having no stabilizing surface element adhered thereto is placed adjacent and adhered to the inner surfaces of the folded corners 38a through 38d, the end insert 42a being adhered to folded corners 38a and 38d, and end insert 42b being adhered to folded corners 38b and 38c. At this point in the construction process, the lightweight casket resembles the configuration shown in FIG. 8 wherein the body containment portion 12 is fully constructed.

The lid of the lightweight casket is fabricated as shown in FIGS. 10–13. Similar to the body containment portion, the lid 14 is formed by placing a lid core section comprised of a honeycomb portion 46 between two lid stabilizing surface elements 48a and 48b as shown in FIG. 10. Due to the curved shape of the lid, the construction of it requires a somewhat different process than the construction of the body containment portion 12. The preferred method of constructing the lid 14 is to construct a jig 50 having an outer portion resembling the shape of the lid 14. The jig 50 is used to construct the lid 14 in a step-like manner which includes the application of a pressure source 52.

As shown in FIG. 10, the jig 50 has an outer section 51 which is substantially in the shape of the lid 14 shown in FIG. 1. To initiate the lid construction process, the first stabilizing surface element 48a is placed into the jig 50. As shown in FIG. 10, the first stabilizing surface element is constructed from one to three separate elements, a center element and two triangularly-shaped end elements. These elements are placed into jig 50. Each of the elements has an edge 54 formed into a rectangular shape and adapted to receive perimeter stabilizing bars 56a through 56d. The perimeter stabilizing bars 56a through 56d form the portion of the lid which contacts the body containment portion 12. It is important that the edges which contact the body containment portion 12 have structural rigidity as well as the lid itself. Therefore, the perimeter bars 56a through 56d are placed into the folded edges 54a–54d and secured therein by adhering the edges 54a–54d thereto.

Referring still to FIG. 10, the honeycomb portion 46, similar to that used with the body containment portion, is now placed into the jig 50 and over the first stabilizing surface element 48a. Prior to the insert of the honeycomb 46, adhesive is spread over the first stabilizing surface element 48a for causing the honeycomb portion 46 to adhere thereto. The honeycomb portion 46 is a substantially rectangular piece of material which is cut to a size which conforms to the lid shape and still contacts the entire surface of the entire first stabilizing surface element. It is not necessary to cut or provide fold lines in the honeycomb portion 46 in any manner due to the flexibility of the same in conforming to the general shape of the lid 14.

With the honeycomb portion 46 inserted therein, the second stabilizing surface element 48b is placed over the top of the inserted honeycomb portion 46. The second stabilizing surface element 48b is rectangular but is comprised of an odd shaped section 58 having triangularly shaped but integral end sections 59a and 59b and having angular fold cuts as shown in FIG. 10. These sections 58 and 59a and 59b are placed on the honeycomb portion 46 as shown in FIG. 11 and conform to the jig 50. Prior to placement onto the honeycomb portion 46, adhesive is applied to the side of the sections which will contact the honeycomb portion 46. With all the elements in place, a pressure source 52 is applied to the integrated sections.

As shown in FIGS. 11 and 12, a flexible cover 60 is hinged to and extends from the edges of the jig 50 via a hinged door 61 and is placed over the integrated elements just discussed, forming an air tight seal. The pressure source connector 62 extends from the flexible portion 60 so as to connect the pressure source 52 thereto. Accordingly, the pressure source 52 is connected to the connector 62 and pressure is applied to the lid 16. The pressure thereby forces the integrated sections together for adhering those which are contacting each other and forcing them into the shape of the jig 50. In addition, an aesthetically pleasing layer 64 is applied to the lid 16 for matching the body containment portion 12. When the air is removed and the sections are adhered together, the jig is disassembled and the lid can be removed, resembling the configuration shown in FIG. 1.

The lid can also be formed in separate halves which is desirable for viewing purposes. The formation of the lid into two separate halves is performed essentially the same as just described except that each half is constructed separately in the jig such that finished edges are formed all around.

For both the body containment portion 12 and the lid 14, materials and patterns other than PCCF arranged in a honeycomb pattern can be used. As shown in FIG. 3a, for example, an environmentally safe polystyrene-type material 65 can be used in lieu of the honeycomb material where it is placed between two stabilizing surface elements. Polystyrene foam placed between similar stabilizing surface elements exhibits substantially the same structural rigidity as the honeycomb portions and can be used interchangeably. Additionally, PCCF and other materials can be formed into truss patterns which also exhibit high structural rigidity when sandwiched between the stabilizing surface elements.

Upon completion of the body containment portion 12 and the lid 14 as substantially described, the lightweight casket is finished by attaching ornamental elements thereto which gives the casket a richer appearance. As shown in FIG. 1, preformed corner pieces 66a through 66d are placed onto the corners of the lightweight casket 10. In addition to appearance, the corners 66a–66d provide extra strength in the body containment portion 12. The corners 66a through 66d are comprised substantially of two triangularly-shaped elements attached perpendicularly to each other. The corners are covered with the same aesthetically pleasing material as the rest of the lightweight casket exhibits. The corners 66a through 66d are simply glued to the body containment compartment corners as shown in FIG. 1. In addition to the corners, handles 68 are securely attached to each side of the lightweight casket for the carrying of the same. The inner portion of the lightweight casket in its finished condition is also designed in an aesthetically pleasing manner having linings and pillows.

The lightweight casket is used in a manner similar to any other casket. Because of the structural rigidity providing by the sandwiching of either the open cell or solid surface core materials, there are no special precautions which must be considered in handling the lightweight casket 10. The body is simply placed in the casket as with any other casket and it can be carried similar to any other casket. For cremation purposes, the casket is highly flammable and, as discussed, is not harmful to the environment and can simply be placed into the furnace without alteration.

The present invention may be embodied in other specific forms without departing from the spirit or essential attributes thereof and accordingly reference should be made to the appended claims rather than to the foregoing specification as indicating the scope of the invention.

What is claimed is:

1. A generally planar blank for folding from a generally planar condition into a folded body containment section of a casket, the blank comprising a core having a bottom surface and a top surface, a first stabilizing surface element attached to the bottom surface, a second stabilizing surface element attached to the top surface, the second stabilizing surface element having a first section and a second section spaced-apart from the first section to form a space therebetween so that a portion of the core adjacent to the space is exposed between the first and second sections to form a fold line.

2. The blank of claim 1, wherein the first stabilizing surface element is formed to include a scored fold line beneath the space.

3. The blank of claim 1, wherein the second stabilizing surface element further includes a third section spaced apart from the second section to form a second space between the second and third sections, a second portion of the core adjacent to the second space being exposed between the second and third sections to form a second fold line.

4. The blank of claim 3, wherein the first stabilizing surface element is formed to include a first scored line beneath the first space and a second scored line beneath the second space.

5. The blank of claim 3, wherein the first, second, and third sections are rectangular planar sections and the second section is positioned to lie between the first and third sections.

6. The blank of claim 1, wherein the top surface of the core defines a top horizontal plane and the bottom surface of the core defines a bottom horizontal plane spaced-apart from the top horizontal plane and generally parallel to the top horizontal plane, and the portion of the core adjacent to the space is angled relative to the top horizontal plane to define an angled cut portion having a longitudinally extending top edge adjacent to the top plane and adjacent to the first section of the second stabilizing surface element and a longitudinally extending bottom edge spaced-apart from the top and bottom planes, the bottom edge being positioned to lie between the first and second sections of the second stabilizing surface elements.

7. The blank of claim 6, wherein the angled cut portion further includes a second elongated top edge adjacent to the top plane and adjacent to the second section of the second stabilizing surface element and the bottom edge is spaced-apart from both of the first and second top edges.

8. The blank of claim 1, further comprising an additional core having a top surface and a bottom surface spaced-apart from and generally parallel to the top surface, the bottom surface of the additional core being attached to the second stabilizing surface element, and a third stabilizing surface element attached to the top surface of the additional core.

9. The blank of claim 8, wherein the top and bottom surfaces of the additional core are substantially the same shape as the second section of the second stabilizing surface element, the bottom surface of the additional core is attached to the second section of the second stabilizing surface element, and the third stabilizing surface element is substantially the same shape as the top surface of the additional core.

10. The blank of claim 1, wherein the core comprises an open-celled material.

11. The blank of claim 10, wherein each cell of the open-celled material includes a wall that is positioned to lie in orthogonal relation to the first and second stabilizing surface elements.

12. The blank of claim 11, wherein the cells are cylindrically shaped cells and the core includes a plurality of such cells interconnected and forming a honeycomb pattern.

13. The blank of claim 1, wherein the core comprises a closed-cell material.

14. The blank of claim 13, wherein the closed-cell material is polystyrene foam.

15. The blank of claim 1, further comprising a decorative material attached to the underside of the first stabilizing surface element.

16. A unitary blank for folding from a generally planar condition into a folded body containment section of a casket, the blank comprising an inner stabilizing surface element, an outer stabilizing surface element positioned to lie generally parallel to the inner stabilizing surface element, and core means coupled to the inner and outer stabilizing surface elements for transferring pressure from the inner stabilizing surface element to the outer stabilizing surface element when a force is applied to the inner stabilizing surface element, the inner stabilizing surface element including a first section and a second section spaced-apart from the first section to provide a space therebetween to serve as a fold line of the core means adjacent to the space.

17. The blank of claim 16, further comprising rigid insert means connected to the first stabilizing surface element adjacent to the space for supporting and strengthening the first stabilizing surface element adjacent to the insert means.

18. A generally planar, unitary blank for folding from a planar condition into a body containment section of a casket, the blank comprising a core having a bottom surface and a top surface, a first stabilizing surface element attached to the bottom surface, a second stabilizing surface element attached to the top surface, the second stabilizing surface element having a first section and a second section spaced-apart from the first section to form a space therebetween, the core being formed to include a first section and a second section spaced-apart from the first section to form a space therebetween, the space of the core being adjacent to the space of the second stabilizing surface element and cooperating therewith to form an insert-receiving space.

19. The blank of claim 18, wherein an insert is received by the insert-receiving space, the insert providing additional support to the first stabilizing surface element iadjacent to the insert-receiving space.

* * * * *